United States Patent [19]

Wahab

[11] Patent Number: 5,733,190
[45] Date of Patent: Mar. 31, 1998

[54] DESMOKING VEHICLE INTERIOR BY PARTITIONING AND VENTILATION

[76] Inventor: Riyad M. Wahab, 2509 Longwood Dr., Springfield, Ill. 62704

[21] Appl. No.: 742,248

[22] Filed: Oct. 31, 1996

[51] Int. Cl.$^6$ ............................................. B60H 1/24
[52] U.S. Cl. ................... 454/164; 454/76; 454/162
[58] Field of Search .................... 454/49, 76, 117, 454/162, 164, 165, 121

[56] References Cited

U.S. PATENT DOCUMENTS

| | | | |
|---|---|---|---|
| 949,212 | 2/1910 | Bogart | 454/117 X |
| 1,582,894 | 5/1926 | Bender | 454/117 |
| 4,741,256 | 5/1988 | Huang . | |
| 4,986,169 | 1/1991 | Chen . | |
| 5,181,883 | 1/1993 | Hofstra et al. | 454/49 |
| 5,261,855 | 11/1993 | Law et al. | 454/164 X |
| 5,391,112 | 2/1995 | Wardlaw . | |
| 5,413,528 | 5/1995 | Pabst et al. . | |
| 5,433,660 | 7/1995 | Ohba . | |
| 5,472,378 | 12/1995 | Skoff . | |
| 5,514,037 | 5/1996 | Downey, Jr. | 454/49 |

FOREIGN PATENT DOCUMENTS

| | | | |
|---|---|---|---|
| 25 37 886 | 3/1977 | Germany | 454/162 |
| 28 03 624 | 8/1979 | Germany | 454/165 |

*Primary Examiner*—Harold Joyce

[57] ABSTRACT

An apparatus reduces the harmful effects of environmental tobacco smoke when a person smoking tobacco and a non-smoking person occupy the interior of a motor vehicle. The apparatus has three components. The first component is a transparent plastic curtain that divides the interior of the motor vehicle into one area containing a smoking person and one area containing the non-smoking person. The second component is an electric exhaust fan that is hung in the area of the interior containing the smoking person. The third component is a tube running from the exhaust end of the fan to a location outside the interior of the motor vehicle.

5 Claims, 5 Drawing Sheets

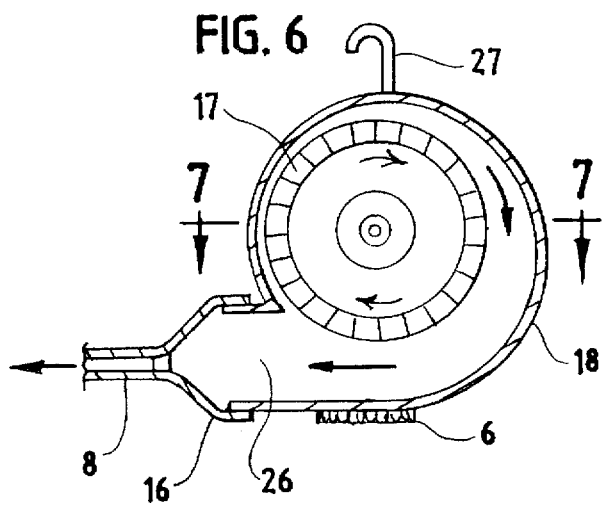
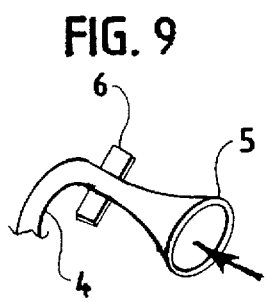
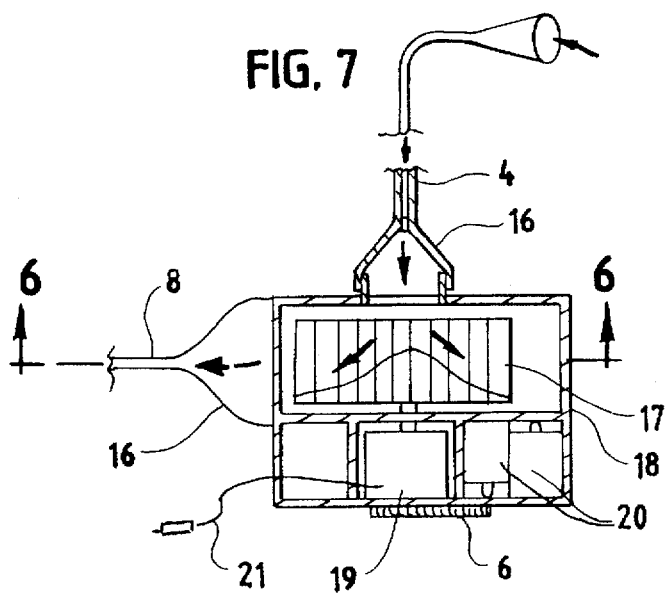
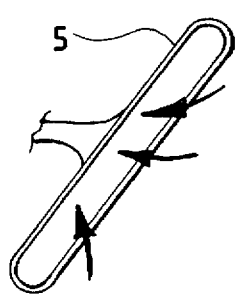
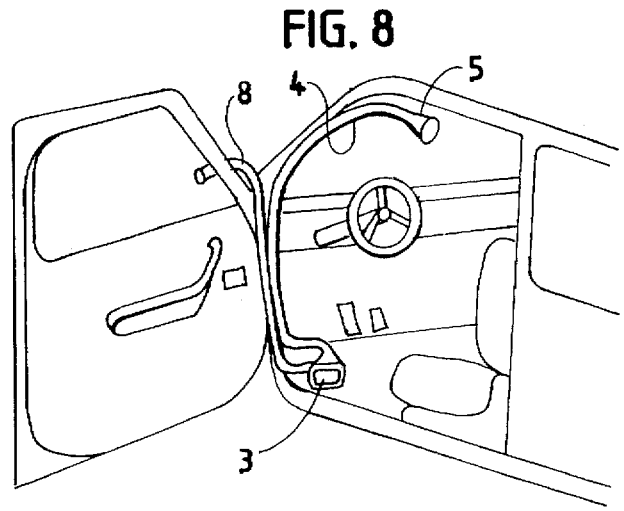

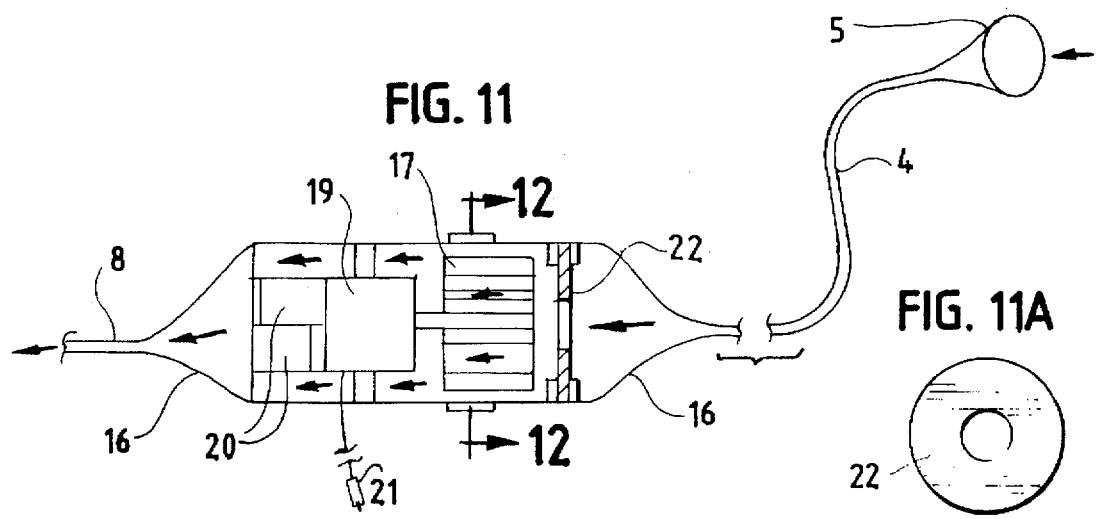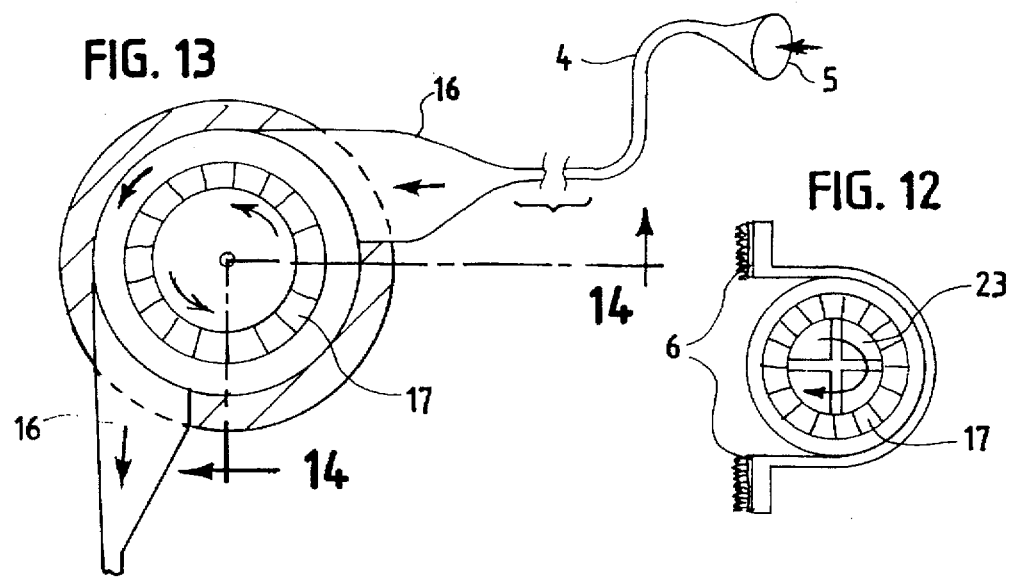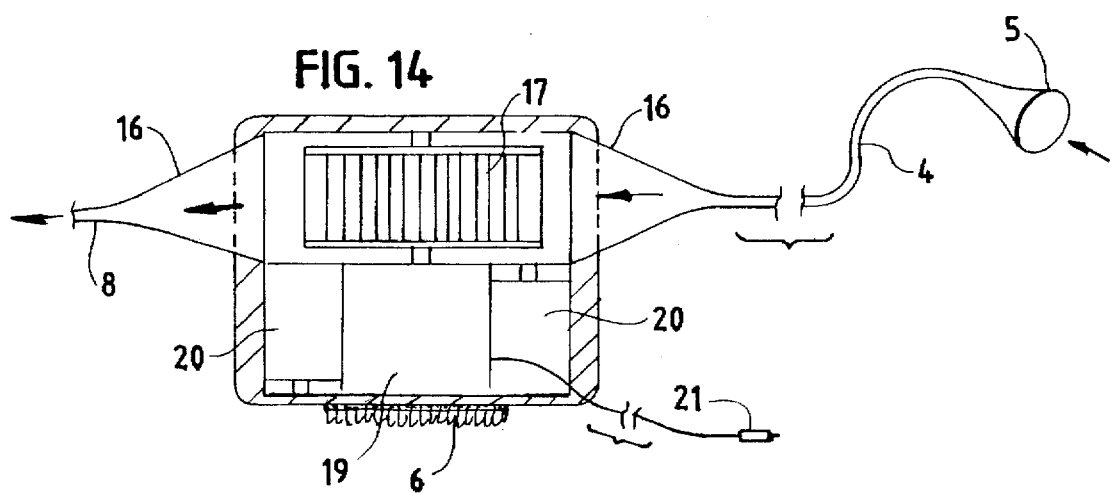

DESMOKING VEHICLE INTERIOR BY PARTITIONING AND VENTILATION

FIELD OF INVENTION

The present invention relates to desmoking a vehicle. More specifically, this invention relates to removing tobacco smoke from the interior of a traveling vehicle, by a combination of a dual action fan (exhaust/ventilation), a tubing system which exhausts smoke outside the vehicle, and a transparent curtain. The curtain slides along a rail in any desired direction, and partitions the vehicle into smoking and non-smoking sections, as desired.

BACKGROUND OF THE INVENTION

Environmental tobacco smoke (ETS) is the second-hand smoke inhaled by non-smokers, who involuntarily happen to be in the same space with smokers. Studies showed that the ETS is human lung carcinogen, responsible for approximately 3,000 lung cancer deaths annually in US non-smokers. Also, ETS has resulted in about 150,000 to 300,000 cases, annually, of bronchitis and pneumonia in infants and young children. The studies also showed that the ETS concentration increases as the size of a smoking space decreases. In a family vehicle, where smokers and non-smokers travel together a long distance, the ETS concentration becomes exactly the same as the first-hand smoke if the windows are closed. All windows are usually closed due to extreme weather conditions, such as too hot, too cold, too windy, or too rainy conditions (dominant in the U.S.A., 10 months a year).

Unfortunately, the air conditioning systems in all current vehicles are not capable of exhausting tobacco smoke from the vehicle interior. Also, most of the new techniques disclosed in various patents, such as U.S. Pat. Nos. 4,741,256; 5,391,112; 5,413,528; 5,433,660; and 5,472,378, focus on improving the air conditioning and ventilation systems for new vehicles. These techniques focus on circulating fresh air inside the vehicle, where the consumed air (along with any tobacco smoke) passes by all passengers before it can be exhausted outside the vehicle. In U.S. Pat. No. 4,986,169 the disclosed ventilating device can only be installed on vehicle windows that roll up and down, without considering other kinds of windows, such as the rear windows in vans, trucks or sport cars. The same device, installed as such, blows air very closely and directly on the driver or passenger, thereby making an unpleasant noise source to said driver or passenger. And, if used to remove consumed air from the vehicle, the same device cannot be mobilized to accommodate for different locations inside the vehicle, as needed. None of the above mentioned patents propose any partitioning technique for desmoking a vehicle.

In the present invention, it is intended to provide a simple, practical, and inexpensive technique to desmoke the interior of a vehicle by: 1) partitioning the vehicle into smoking and non-smoking sections, of any desired shape; using a light weight and transparent (crystal clear) plastic curtain that slides along rails. The rails can be attached to the vehicle ceiling by Velcro strips (or equivalent), with adhesive backing; and 2) by providing a special portable, dual function (exhaust/blower) fan that removes smoke from the smoking section and exhausts the smoke outside the vehicle through small diameter, rubber tubing that fits between the door and body. If only ventilation is desired, the inlet and exhaust tubing can simply be detached from the fan inlet and outlet, respectively, to blow fresh air into the vehicle through a coarse filter.

SUMMARY OF THE INVENTION

With this invention, I intend to remove tobacco smoke from vehicle interior by using a partitioning curtain and exhaust fan, when all windows are closed. As shown in FIG. 1, the invention consists of: a clear, light weight, plastic curtain (1) that slides in any desired direction along a rail (2), and partitions the vehicle into smoking and non-smoking sections; a portable exhaust/blower fan (3) that draws smoke from the smoking section through flexible, light weight, tubing (4) and inlet (5). The rail and tubing are attached to the interior surface by Velcro strips (6), with adhesive backing, at desired locations. The smoke inlet can be placed at a plurality of locations (7), depending on the smoking section configuration. The fan (3) exhausts smoke outside the vehicle through a flexible, small diameter and thick-walled tubing (8), fitting the space between the vehicle door and body.

BRIEF DESCRIPTION OF THE DRAWINGS

FIG. 6 is a section of a squirrel cage type exhaust/blower fan, as one alternative, along line 6—6 of FIG. 7.

FIG. 7 is a section of the fan along line 7—7 of FIG. 6.

FIG. 8 shows one possible location for the fan and the tubing arrangement.

FIG. 9 shows one possible shape for the smoke inlet.

FIG. 10 shows another possible shape for the smoking inlet.

FIG. 11 shows a section of an axial flow type fan, as another alternative to the squirrel cage type fan.

FIG. 12 shows a section of the axial flow fan along line 12—12 of FIG. 11.

FIG. 13 shows a section of a third option fan; a cross-flow type.

FIG. 14 shows a section of the fan along line 14—14 of FIG. 13.

DETAILED DESCRIPTION OF THE INVENTION

Figure 1:
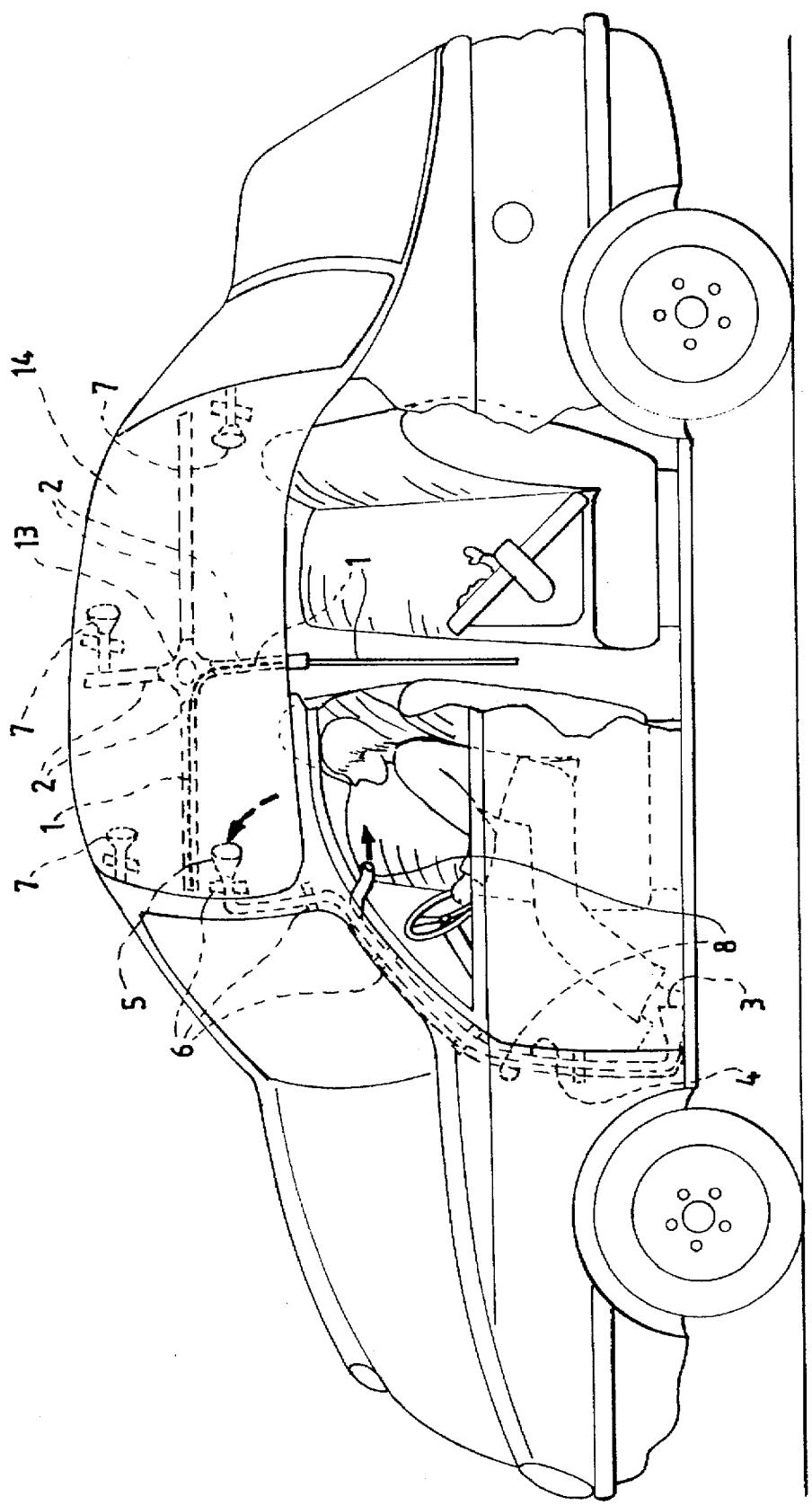
FIG. 1 is a schematic view of the invention, showing the main items of the desmoking system.
Figure 2:
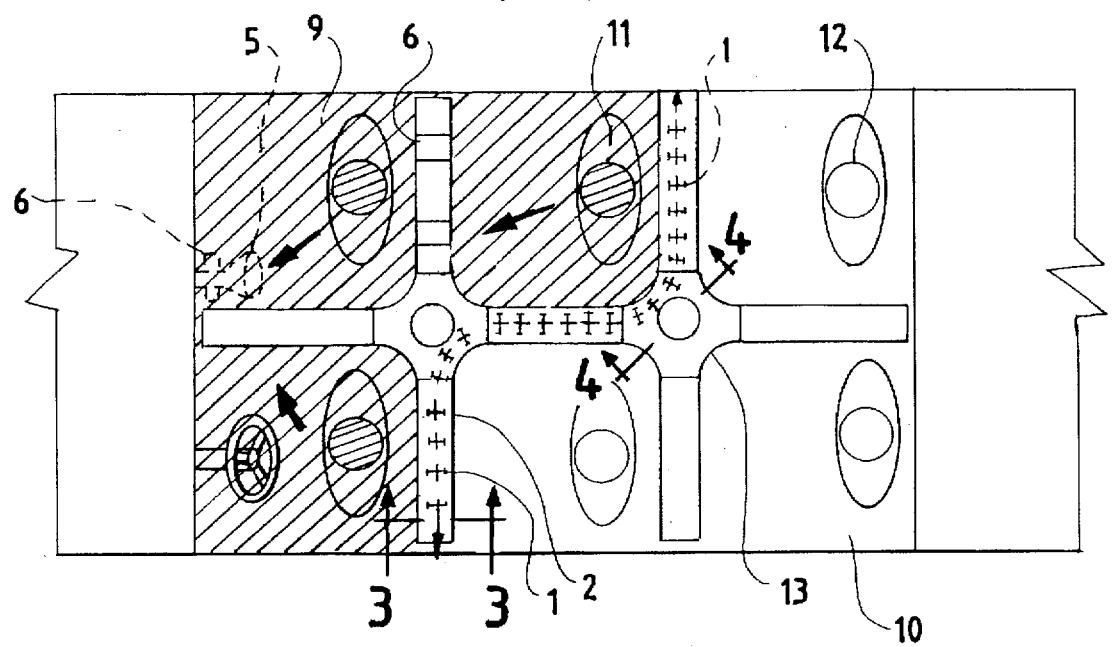
FIG. 2 shows an example plan view of the rail and curtain (partitioning) configuration for dividing the vehicle into smoking and non-smoking sections.

FIG. 2 shows the different elements of a partitioning system in a vehicle. The system consists of a light weight, transparent curtain (1), sliding along a rail (2) in any desired direction to partition the vehicle into a smoking section (9), represented by the shaded area, and a non-smoking section (10). This is an essential procedure for separating smoking people (11) from non-smoking people (12), traveling in the same vehicle, while the windows are closed. Based on the experiments that I conducted, the use of any ventilation technique inside a vehicle, without partitioning, can only remove less than 60% of the smoke. A combination of partitioning and ventilation is the only successful technique for removing more than 95% of the ETS. The curtain (1) should be made of a light weight, transparent material (such as polypropylene or polyethylene, with a maximum weight of 2 ounces per square yard). The rail (2) should also be made of light weight plastic material that can be attached to the vehicle ceiling by Velcro strips (6) at a plurality of locations. All Velcro strips (6), recommended for use in this invention, should be made with adhesive backing to suit the vehicle interior surface (fabric or vinyl).

Depending on the vehicle size and the desired size of the smoking section, it is estimated that the curtain height (H) and length (L) could vary from 24 to 30 inches and from 60 to 72 inches, respectively. Before smoking begins, the exhaust fan (3) should be turned on for 3 to 5 minutes. Also, depending on the desired waiting time (of 3 to 5 minutes) and the size of the smoking section (9), it is estimated that a fan capacity of 15 to 20 CFM is necessary to initiate an air flow in the direction of the smoke inlet (5). The inlet (5) can be attached to the vehicle ceiling at the desired location by using a Velcro strip (6). Depending on the size and weight of the fan, and as the vehicle interior permits, the inlet (5) and associated tubing (4) can both be removed and replaced by the fan itself (3) to receive smoke at the desired location.

Figure 3:
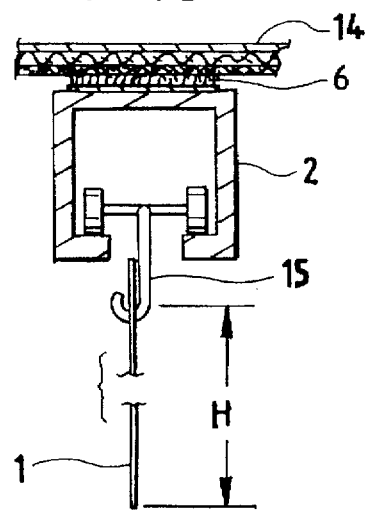
FIG. 3 is a section of the rail, the roller and the curtain along line 3—3 of FIG. 2.
Figure 4:
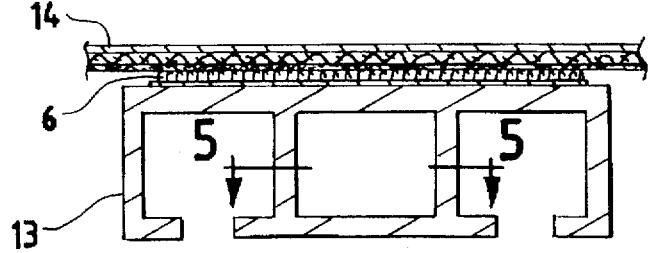
FIG. 4 is a section of the curtain intersection along line 4—4 of FIG. 2.
Figure 5:
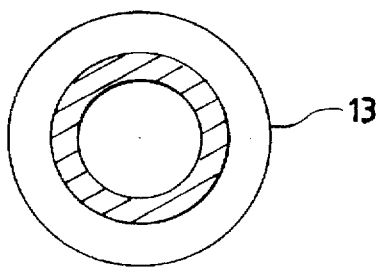
FIG. 5 is a section along line 5—5 of FIG. 4.

Also, FIG. 2 shows a special rail intersection (13), that allows the curtain (1) to slide in any desired direction. FIG. 3 shows a typical cross-section (Sec. 3—3) through the curtain (1) and the rail (2); wherein the rail is attached to the vehicle ceiling (14) by the Velcro strips (6), and hooks (15) attached to the curtain (1) at a plurality of locations. The hooks slide on rollers along the rail. FIG. 4 shows a typical cross-section (Sec. 4—4) through the rail intersection (13). FIG. 5 shows a cross-section (Sec. 5—5) through the inner circle of the rail intersection; wherein the rollers (and the curtain) could slide around or reverse direction.

FIGS. 6 and 7 show typical cross-sections (Secs. 6—6 and 7—7) through the fan (3), the inlet tubing (4), the exhaust tubing (8), and their cone-shaped connections (16) which can be attached to the fan by a screw or an interlocking latch, as will be shown. The fan (3) comprises squirrel cage type of blades (17); a spiral casing (18); and an electric motor (19), which can be operated by batteries (20) or by the vehicle main battery, through a plug (21) into the cigarette lighter.

Except for the exhaust end of tubing (8), the tubings (4) and (8) will remain inside the vehicle, and should be thin-walled (0.5 in. outside diameter) and made of a light weight, flexible plastic material (such as nylon, polyester or polypropylene, with a maximum weight of 0.3 ounce per foot). The last 8 inches of tubing (8) will slightly be squeezed between the vehicle door and body (after closing the door) to exhaust smoke outside the vehicle. This exhaust end should be a thick-walled tubing (0.25 in. OD, 0.125 in. ID) and made of light weight, synthetic rubber resistant to ultra violet light. This exhaust tube can be located as desired, depending on the exact location of the fan (3) relative to the nearest door. FIG. 8 shows one possible location for the fan (3), as well as the tubing arrangements. The fan, located as such, can be attached by a wide Velcro strip (6), either to the lower door frame on the fan side (FIG. 6), or to the floor at the bottom of the fan (FIG. 7). FIGS. 9 and 10 show two possible shapes for the smoke inlet (5).

FIGS. 11 and 12 show cross-sections through another fan option: an axial flow type fan; wherein the smoke is drawn into the fan through a circular plate (22), with a large orifice, then through a passage way (23) within the rotating squirrel cage blades (17), as shown in FIG. 12, then around the motor (FIG. 11) exiting out through the exhaust tubing (8). This type of fan can easily by attached to the vehicle interior, at any location, with a band and Velcro strips (FIG. 12). FIGS. 13 and 14 show, respectively, a plan and a cross-section (Sec. 14—14) of a cross-flow type fan, as a third option. The same item definitions, as before, apply to this fan with different arrangements as shown. The details of three fan options are provided, herein, to add versatility to this invention, consider ease of manufacturing the fan at needed flow capacity efficiently, and to accommodate for a wide variety of vehicle interiors. The recommended size of fan depends on its shape and on the vehicle's interior design, which also determines the best fan location (if desired to be permanent). To fit the fan into the smallest vehicle, the maximum fan width, height and length should not exceed 4, 5 and 10 inches, respectively. For an axial flow fan, FIGS. 11 and 12, the maximum fan diameter should be 5 inches and the length 10 inches including the cone attachments. With these dimensions, the fan can easily be attached to the vehicle interior at a variety of locations using Velcro strips.

Figure 15:
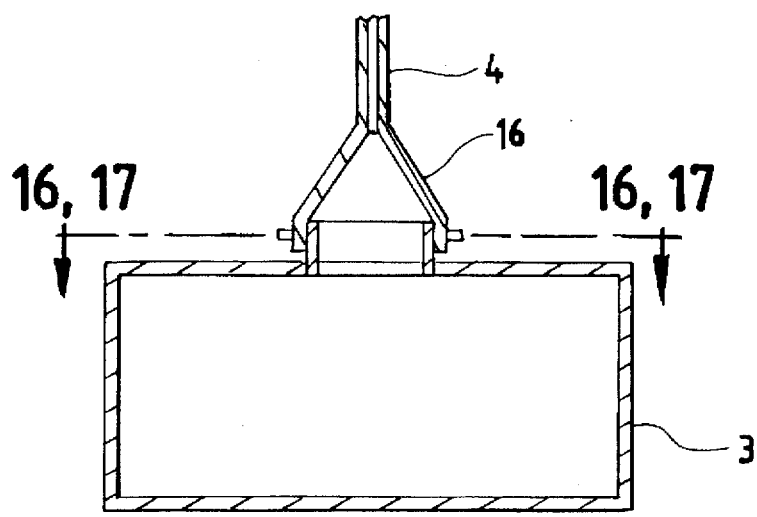
FIG. 15 a section of fan-to-tubing attachment.
Figure 16:
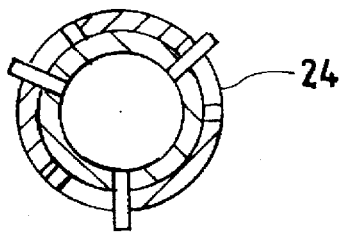
FIG. 16 shows a section, along line 16—16 of FIG. 15, for an interlocking latch type of fan-to-tubing attachment.
Figure 17:
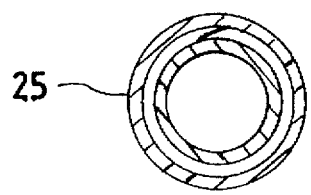
FIG. 17 shows a section, along line 17—17 of FIG. 15, for a screw type attachment.
Figure 18:
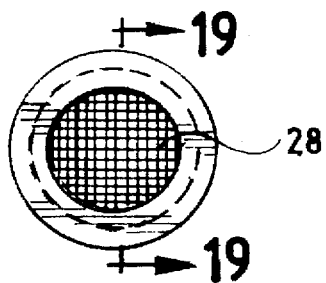
FIG. 18 shows a view of a coarse filter.
Figure 19:
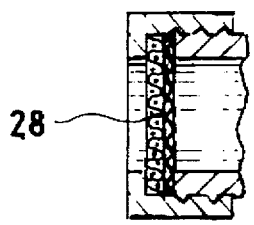
FIG. 19 shows a section of the filter along line 19—19 of FIG. 18.

FIGS. 15, 16 and 17 shows cross-sections of two types of fan-to-tubing attachments: an interlocking latch (24) and a screw type (25) attachment. With such simple attachments, the fan can also be used as a blower for air circulation, if desired, when it is not used for desmoking. This can easily be accomplished by detaching (unscrewing or unlatching) the inlet and exhaust tubing connections (16), FIG. 6, attaching a coarse filter to the blower side (26), and hanging the fan to the interior mirror holder with a hook (27), or attaching the fan to the vehicle interior at any locations with a wide Velcro strip. For such dual function (exhaust/blower) fan, light weight and durable plastic materials should be used for the fan and its connections. FIGS. 18 and 19, respectively, show a view and a cross-section of a coarse filter (28) with a screw type fan attachment.

I claim:

1. An apparatus for reducing the harmful effects of environmental tobacco smoke when a person smoking tobacco and a non-smoking person occupy the interior of a motor vehicle, the apparatus comprising:

(a) a transparent plastic curtain that substantially divides the interior into one area containing the smoking person and one area containing the non-smoking person;

(b) an electric exhaust fan having a means for hanging the fan, or its inlet, in the area of the interior containing the smoking person; and (c) a tube running from the exhaust end of the fan to a location outside the interior.

2. The apparatus of claim 1 wherein the fan is of the squirrel cage, axial flow, or cross-flow type.

3. The apparatus of claim 2 wherein the tube runs to a location between a door of the motor vehicle and the body.

4. The apparatus of claim 2 wherein the fan is powered by batteries or by an electric system of the motor vehicle.

5. The apparatus of claim 2 wherein the exhaust fan is convertible into a blower for circulating the air inside the vehicle.

\* \* \* \* \*